United States Patent
Ma

[19]

[11] Patent Number: 6,129,333
[45] Date of Patent: Oct. 10, 2000

[54] SPRING LOCKING MECHANISM

[75] Inventor: Weijian Ma, Liverpool, N.Y.

[73] Assignee: Young & Franklin, Liverpool, N.Y.

[21] Appl. No.: 09/134,612

[22] Filed: Aug. 14, 1998

[51] Int. Cl.[7] ............................ F16K 31/02; F16K 31/04; F16H 1/18

[52] U.S. Cl. .................. 251/68; 74/89.15; 74/424.8 VA; 251/69; 251/71; 251/76; 251/129.11

[58] Field of Search ................................... 251/68, 69, 70, 251/71, 76, 129.11, 129.12, 129.13, 111, 114, 116; 74/89.15, 424.8 VA

[56] References Cited

U.S. PATENT DOCUMENTS

| | | | |
|---|---|---|---|
| Re. 30,135 | 11/1979 | Fitzwater et al. | 251/71 |
| 3,279,744 | 10/1966 | Fieldsen et al. | 251/71 |
| 3,430,916 | 3/1969 | Raymond, Jr. | 251/71 |
| 3,466,005 | 9/1969 | Kleeberg | 251/71 |
| 3,512,421 | 5/1970 | Anderson | 251/71 |
| 3,518,891 | 7/1970 | Denkowski | 251/71 |
| 3,640,140 | 2/1972 | Gulick et al. | 251/71 |
| 4,090,589 | 5/1978 | Fitzwater | 251/71 |
| 4,253,640 | 3/1981 | Priese et al. | 251/56 |
| 4,436,280 | 3/1984 | Geisow | 251/58 |
| 4,687,179 | 8/1987 | Smith | 251/58 |
| 5,195,721 | 3/1993 | Akkerman | 251/129.13 |
| 5,299,592 | 4/1994 | Swanson | 137/59 |
| 5,311,898 | 5/1994 | Taylor | 137/67 |
| 5,375,576 | 12/1994 | Ausman et al. | 251/48 |
| 5,497,672 | 3/1996 | Appleford et al. | 74/424.8 VA |
| 5,599,003 | 2/1997 | Seemann et al. | 251/30.03 |
| 5,601,275 | 2/1997 | Hironaka | 251/129.15 |
| 5,983,743 | 11/1999 | McGregor et al. | 251/129.13 |
| 5,984,260 | 11/1999 | Rawson et al. | 251/71 |

*Primary Examiner*—George L. Walton
*Attorney, Agent, or Firm*—Wall Marjama Bilinski & Burr

[57] ABSTRACT

Apparatus for rapidly changing the state of a device from an active state to an inactive state. The apparatus includes an inner member slidably contained in an outer member. The member is connected to an actuator and the other to a control for changing the state of a device. A latch mechanism normally holds the two members locked together so that the control means responds to the actuator. When a potentially dangerous situation is sensed, the latch mechanism is opened and the two members are rapidly forced apart by a heavy release spring thus rapidly changing the state of the device from an active state to an inactive state.

13 Claims, 5 Drawing Sheets

6,129,333

SPRING LOCKING MECHANISM

BACKGROUND OF THE INVENTION

This invention relates generally to a rapid release mechanism and in particular, to apparatus that is ideally suited to rapidly close a valve in the event an unsafe condition is sensed.

As disclosed in U.S. Pat. Nos. 5,311,898; 5,599,003 and 5,601,275, devices have been developed for rapidly closing valves when a potentially harmful condition is detected. Many of the prior art devices are solenoid or spring activated with the solenoid or spring exerting a continuing force upon the valve actuator when the valve is in operation. This load is generally relatively high and can produce unwanted wear and fatigue on the valve operating mechanism. In addition, the continuously energized solenoid can consume a relatively high amount of energy, thus increasing the operational cost of the valve.

Many quick release devices are required to operate in remote locations under rather harsh environmental conditions. The devices sometimes are not required to release for long periods of time. Accordingly, it is highly desirous that the devices that are forced to operate under these adverse conditions must be highly reliable. However, many quick release devices found in the prior art are rather complex and involve a number of inter-related moving parts. As the complexity of the devices and the number of inter-related components increase the reliability of the equipment most often decreases and, as such, their usefulness under harsh operating conditions is seriously diminished.

SUMMARY OF THE INVENTION

It is a primary object of this invention to improve quick release mechanisms and, in particular, quick release mechanisms for use in conjunction with a valve to insure rapid and reliable closure of the valve in the event an unsafe condition is detected.

A still further object of the invention is to improve the reliability of a quick release mechanism.

A still further object of the present invention is to provide a quick release mechanism that can operate reliably under harsh operating conditions.

Another object of the present invention is to reduce the amount of moving parts and the weight of the quick release mechanism.

Yet another object of the present invention is to lessen the amount of energy consumed by a solenoid activated quick release mechanism.

Yet a further object of the present invention is to improve quick release devices for valves and the like that produce a minimum amount of shock and vibration when moving through a release operation.

These and other objects of the present invention are attained by a quick release mechanism that includes an elongated inner member slidably contained within an elongated outer member. While the inner member is connected to an activator. The outer member, in turn, is connected to a driven member such as a valve stem, a control lever, or the like. The inner and outer members are releasably interconnected by a plurality of retractable bolts that are movably contained within the inner member. The bolts are moveable radially from a first retracted position wherein the bolts are fully contained within the inner member and an extended position wherein the bolts are received within a complimentary recess formed within the outer member. A latch is arranged to lock the bolts in their extended position when latched and to free the bolts when unlatched. A solenoid activated plunger acts upon the latch to hold the bolts in the locked position when the solenoid is energized and to release the latch when the solenoid is de-energized. A piston is mounted inside the inner member beneath the bolts and is connected to the solenoid plunger by a connecting arm. A biasing spring, in turn, acts on the piston to provide a balancing force on the plunger that is slightly less than the energizing force of the solenoid that is needed to hold the latch in the bolt locking condition. Upon de-energization of the solenoid, the biasing spring pushes the plunger back allowing the latch to move back into a release or unlatched position. A second stronger release spring is arranged to act between the two elongated members with sufficient force to cause rapid separation. The distal ends of the bolts are contoured to compliment the shape of the receiving recess formed in the outer member which is contoured to direct the bolts radially into the inner member. As the members are forced to separate under the influence of the strong release spring, the bolts are driven back into the inner member and the driven member is moved rapidly into a closed or inactive position.

BRIEF DESCRIPTION OF THE DRAWINGS

For a better understanding of these and other objects of the present invention, reference will be made below to a detailed description of the invention which is to be read in association with the accompanying drawings wherein.

DESCRIPTION OF THE INVENTION

Figure 1:
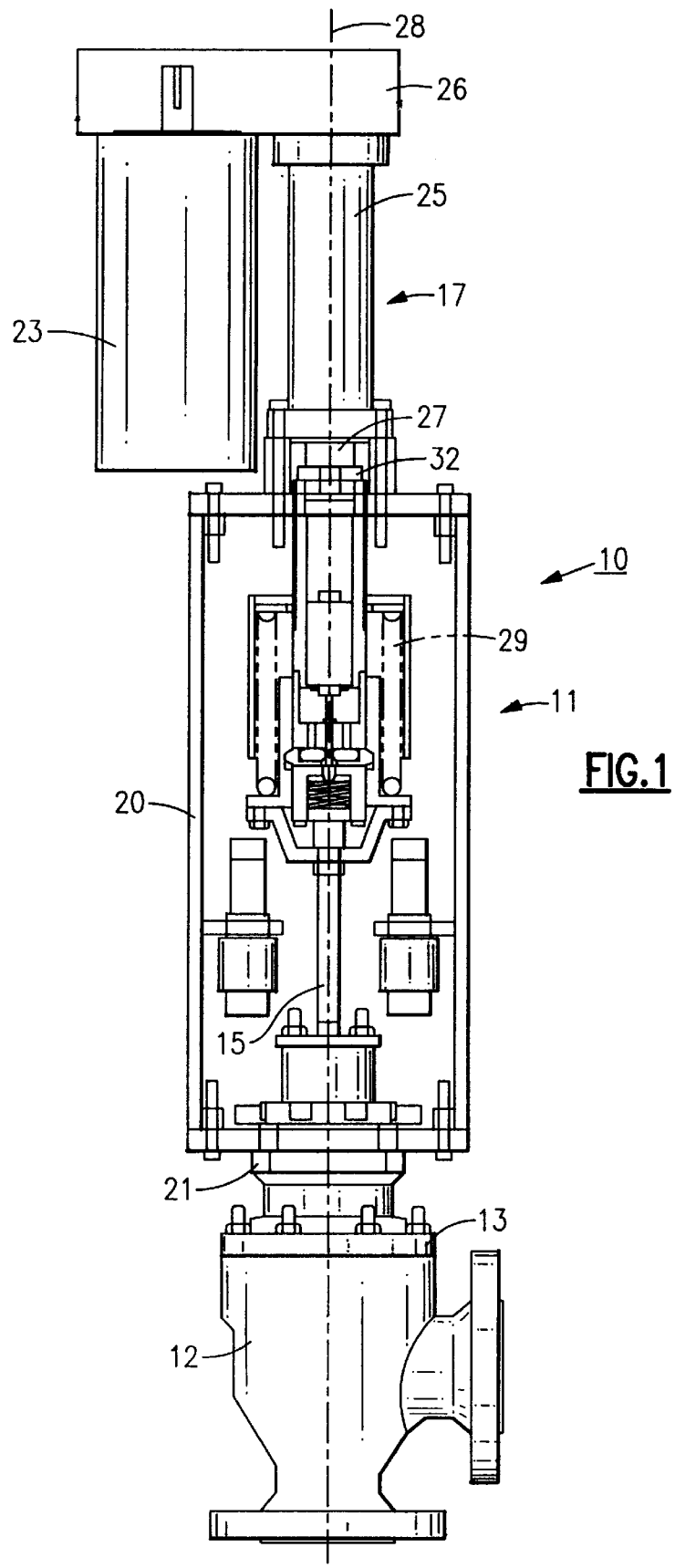
FIG. 1 is a side elevation of a valve embodying the quick release mechanism of the present invention.

Turning now to FIG. 1, there is shown a valve assembly generally referenced 10, employing a quick release mechanism 11 embodying the teachings of the present invention. The valve includes a casing 12 which houses a plunger type valve (not shown) for controlling the flow of a fluid through the valve. The valve further includes a flanged cap 13 that is bolted or otherwise secured to the casing 12. A valve stem 15 is mounted and sealed in the cap for reciprocal movement toward or away from the valve body along a vertical path of travel. Moving the valve stem upwardly away from the valve body causes the valve to open while moving the stem in the opposite direction causes the valve to close. The valve stem is joined to a linear actuator 17 through means of the quick release mechanism 11 the function of which will be explained in greater detail below.

Although the present invention will be described with specific reference to a valve, it should be understood that the present invention has wider application and can be utilized in association with any type of device that changes state between an active state and an inactive state such as a switch, a gate vane or the like, and which under certain adverse working conditions, must be rapidly cycled from the active state to the inactive state.

The actuator 17 is mounted above the valve body within a frame 20 that is secured in the valve cap by means of a mounted flange 21. The actuator can be of any of a number of well known types. As illustrated in FIG. 1, the present actuator includes an electric motor 23 that is geared to a screw driven spindle unit 25 through a gear box 26. The spindle 27 is adapted to move up and down along the axis 28 of the valve stem. Under normal operating conditions, the actuator spindle is connected to the valve stem through means of the quick release mechanism 11 so that the valve stem moves in response to the positioning of the actuator spindle to control the opening and closing of the valve. When a potentially dangerous condition is detected, however, the connection between the actuator and the valve stem is broken and, as will be explained below, the valve stem is forced rapidly in a downward direction under the influence of a heavy duty return spring 29, thus closing the valve.

Figure 2:
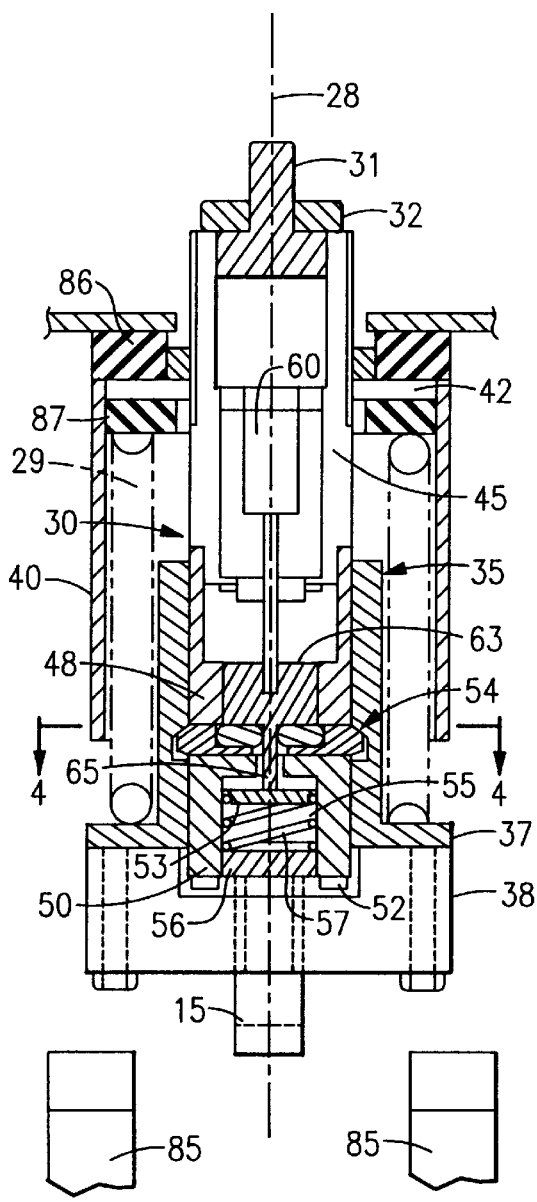
FIG. 2 is a partial front view, in section, of the release mechanism illustrated in FIG. 1 showing the mechanism in a locked condition.
Figure 3:
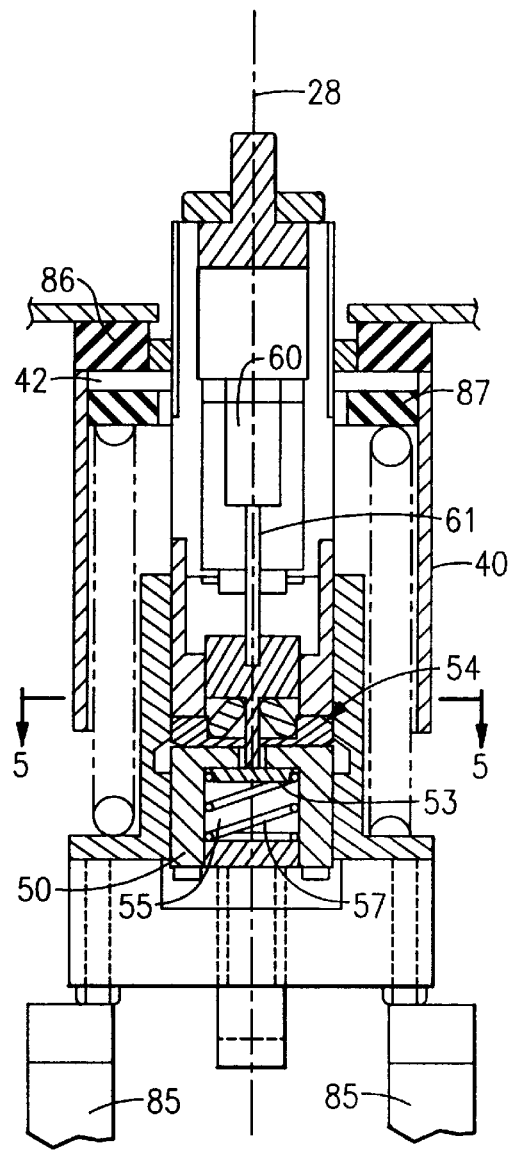
FIG. 3 is a view similar to FIG. 2 showing the release mechanism in an unlocked condition.

Turning now more specifically to FIGS. 2 and 3, there is shown in further detail the quick release mechanism 11 of the present invention. FIG. 2 illustrates the mechanism in a locked condition wherein the valve stem moves in response to the actuator spindle. FIG. 3, on the other hand, illustrates the mechanism in an unlocked condition wherein the valve stem is separated from the actuator and thus, permitted to be driven downwardly by the previously noted release spring.

The spindle 27 of the actuator is connected to an elongated cylindrical shaped inner member 30 by means of an adaptor screw 31 and lock nut 32 arrangement. The inner member will be hereinafter referred to as the inner cylinder. The inner cylinder is thus secured to the actuator spindle and is adapted to move vertically with the spindle. An elongated cylindrically shaped outer member 35, which is herein referred to as the outer cylinder, is arranged to slide over the inner cylinder. The outer cylinder contains a radially expanded flange 37 that is bolted to a connector 38 in which the distal end of the valve stem is threaded or otherwise secured.

A return spring housing 40 is secured to the inner cylinder and forms a shroud about the return spring 29. In assembly, the return spring is arranged to act between the top wall 42 of the spring housing and the expanded flange 37 of the outer cylinder 35.

The inner cylinder includes an upper body section 45 which is connected to the actuator spindle. The top wall of the return spring housing is secured by welding to the upper body section. The inner cylinder further includes a center adaptor 48 and a lower end cap 50. The adaptor is threaded into the upper section of the inner cylinder and the end cap, in turn, is bolted to the adaptor using cap screws 52 to complete the assembly.

A piston 53 is slidably contained within a cavity 55 formed in the end cap. A cover plate 56 is secured in the bottom of the cavity and serves to close the cavity. A spring 57 is mounted in the cavity and is arranged to act between the piston and the cover plate to urge the piston in an upward direction.

A solenoid 60 is mounted in a fixed position within the inner cylinder and includes a push rod 61 that is aligned along the axis 28 of the mechanism. The push rod, in turn, is connected to a stem 63 that is slidably contained within the center adaptor section of the inner cylinder. The stem further includes a downwardly extended arm 65 that is integral with the stem and which bears against the piston 53 contained within the end cap cavity 55. The rod thus accepts the force of the biasing spring exerted upon the piston urging the piston in an upward direction.

A locking assembly generally referenced 54, is also contained within the inner cylinder which is operable to lock the outer cylinder to the inner cylinder so that the two cylinders move together as a unit under normal operating conditions allowing the valve stem. When the two cylindrical members are locked together, the release spring is contained within the spring housing in a loaded condition so that it is capable of exerting a high separating force between the inner and outer cylinders.

Figure 4:
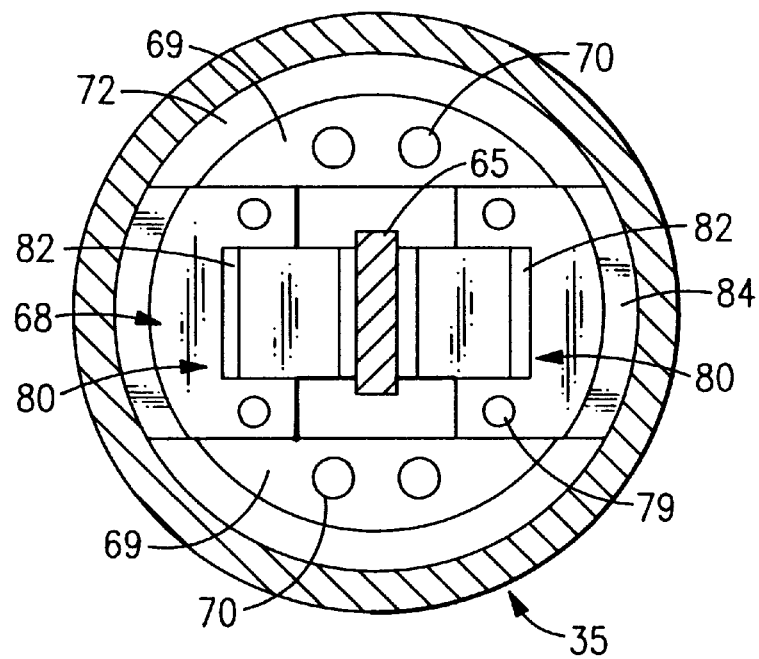
FIG. 4 is an enlarged sectional view taken along lines 4—4 in FIG. 2.
Figure 5:
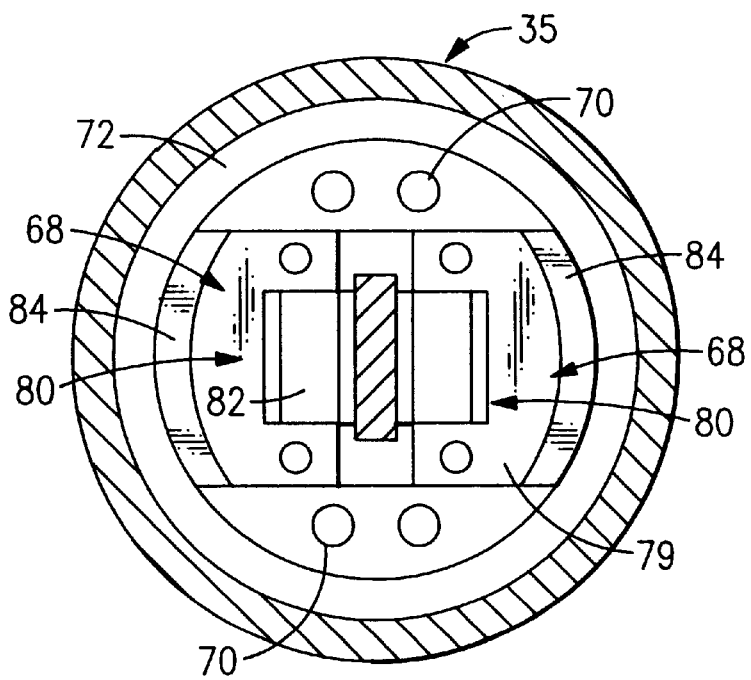
FIG. 5 is an enlarged sectional view taken along lines 5—5 in FIG. 3.
Figure 8:
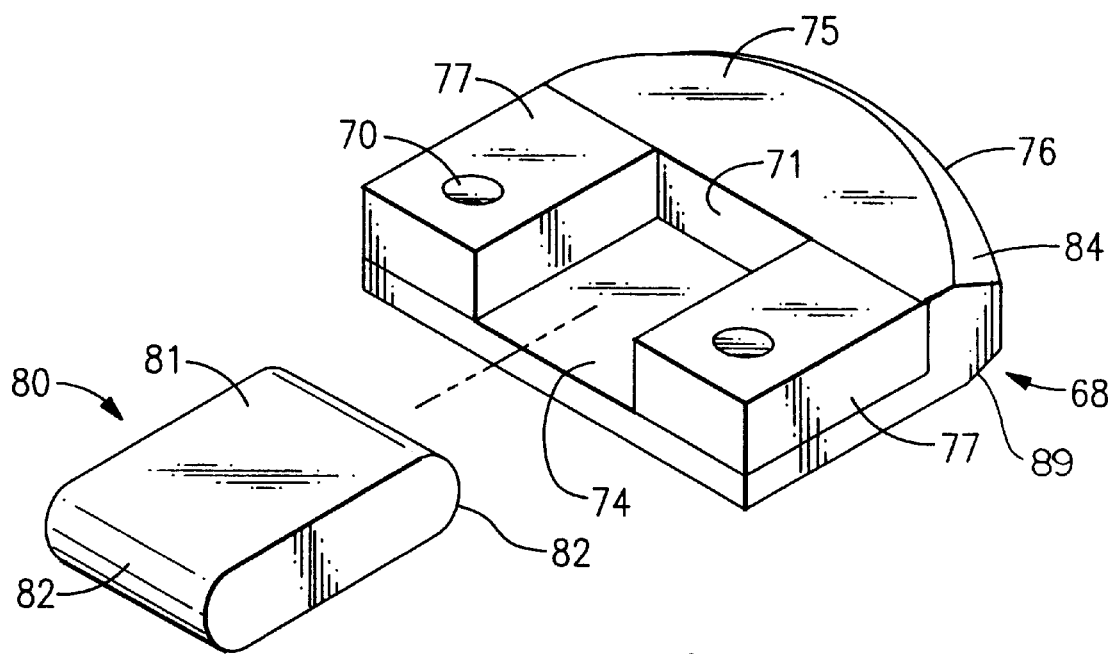
FIG. 8 is an enlarged perspective view showing in greater detail the bolt and latching mechanism illustrated in FIGS. 4 and 5.

The locking assembly is shown in greater detail in FIGS. 4, 5 and 8 and includes a pair of opposed bolts 68—68 that are slidably retained upon the top surface of the end cap between guide blocks 69—69 (FIG. 4). The guide blocks are secured to the top of the end cap by screws 70—70. Each of the bolts contain a recess 71 (FIG. 8) centrally located therein in which a latch pin 80 is seated. The latch pins are retained in the recesses by the bottom surface of the stem 63. The bolts are arranged to move radially between a fully retracted position as shown in FIG. 5 wherein the bolts are fully retained within the inner cylinder and an extended position as shown in FIG. 4 wherein the distal end of each bolt is located within a circumferential groove 72 formed in the inner wall of the outer cylinder.

As best illustrated in FIG. 8, each bolt 68 includes a horizontal platform 74 and a raised distal end section 75 that has a curved end wall 76 that compliments the radius of curvature of the groove formed in the outer cylinder. The bolt further includes a pair of spaced apart side plates 77—77 that are secured to the top of the platform by screws 79 to establish the previously noted open top recess in the bolt. Latch pins 80 are retained in the bolt recesses and as will be explained below, function to move the bolts between the locked position (FIG. 5) and the unlocked position (FIG. 4).

Each latching pin 80 is a rectangular shaped lug 81 (FIG. 8) having semicircular ends 82 that allow the lug to roll about its two ends without binding. The distal end of each bolt is provided with a top chamfer 84 and a bottom chamfer 89 that extend about the arcuate shaped end wall periphery. The top chamfer compliments the top surface of groove 72 which establishes an inclined plane upon which the bolt rides as it moves in or out of the groove. The inclination of the top chamber 84 is such that the bolt will automatically ride out of the groove when, as explained below, the holding force exerted on the bolts by the latching mechanism is released and the bolts come under the influence of the release spring 29.

Returning now to FIG. 2, initially when the system starts up or is restarted, the actuator forces the return spring housing and the inner cylinder downwardly, thus placing the return spring in a compressed or loaded condition. When the activator reaches the end of its stroke, the solenoid is energized forcing the stem to drive the latching pins downwardly causing the bolts to move outwardly in a radial direction. At this time, the groove in the outer cylinder becomes aligned with the bolts and the distal end of each bolt passes into the groove as shown in FIGS. 2 and 4. The actuator thus is locked to the valve stem and the solenoid current is dropped to a minimum value which is just sufficient to provide a holding force against the latch pins to hold the bolts in the extended or locked position.

At this time, the arm 65 of the stem has also pushed the piston 50 in the end cap cavity down against the set spring compressing the set spring so that it exerts a counter force on the piston tending to force the stem upwardly. The solenoid force is such that it offsets the set spring force, thus holding the latch pins in bolt locking position. Once the inner and outer cylinders are locked together, the actuator returns to a preset start of stroke position and is ready to begin normal valve control operations.

In the event a potentially hazardous condition is sensed, the solenoid is de-energized either by the actuator control system (not shown) or by a loss of power to the solenoid. The previously loaded set spring now takes over and forces the stem upwardly away from the latch pins. This, in turn, allows the latch pins to rotate to the sixty degree position shown in FIG. 3, thus releasing the bolts. The fully compressed release spring now forces the two cylindrical members apart and the bolts are simultaneously forced by the action of the release spring radially back along the inclined upper surface of the groove 72 into the inner cylinder freeing the outer cylinder from the inner cylinder. The release spring continues to drive the outer cylinder and the valve stem down rapidly, thus closing the valve.

A pair of shock absorbers 85—85 are mounted inside the frame and serve to arrest the downward movement of the outer cylinder member when the valve reaches the closed position thereby preventing the mechanism from being damaged as it moves rapidly into the valve closing position. Similarly elastomeric shock damping rings 86 and 87 are mounted above and below the top wall of the release spring housing which serve to absorb any upwardly directed forces when the mechanism undergoes a quick release.

Figure 6:
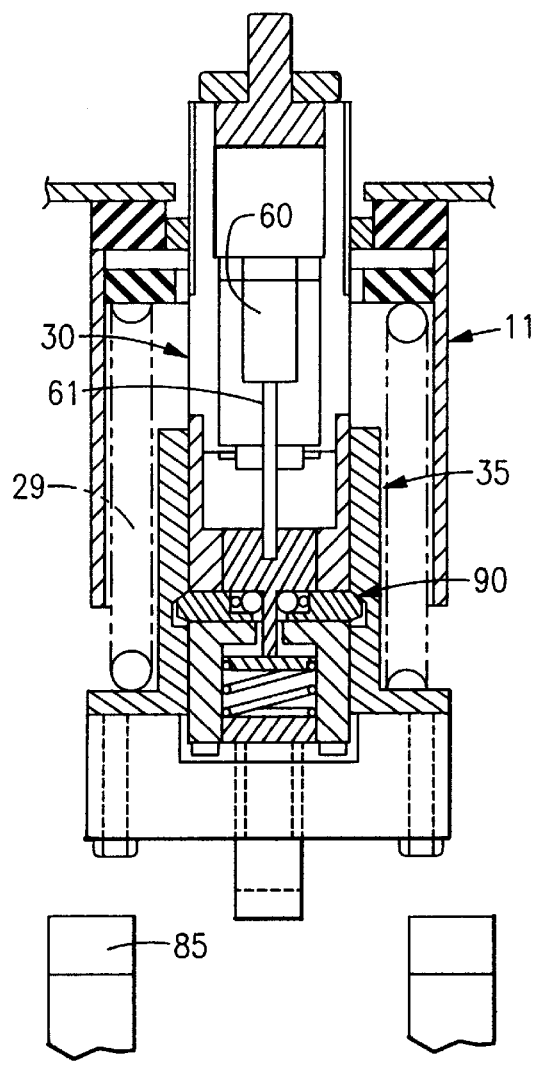
FIG. 6 is a partial front view, in section, illustrating a second embodiment of the invention showing the release mechanism in a locked position.
Figure 7:
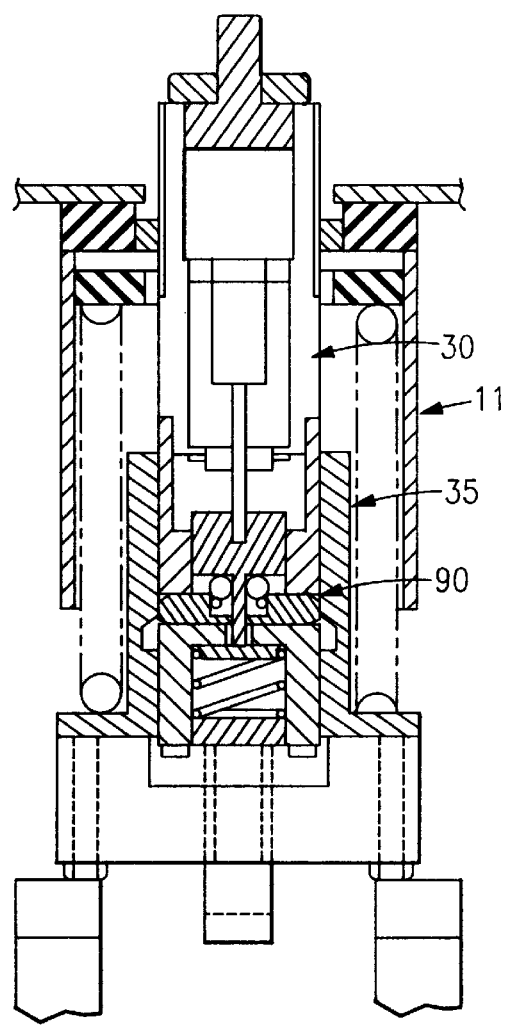
FIG. 7 is a partial front view similar to that shown in FIG. 6 illustrating the release mechanism in an unlocked position.
Figure 9:
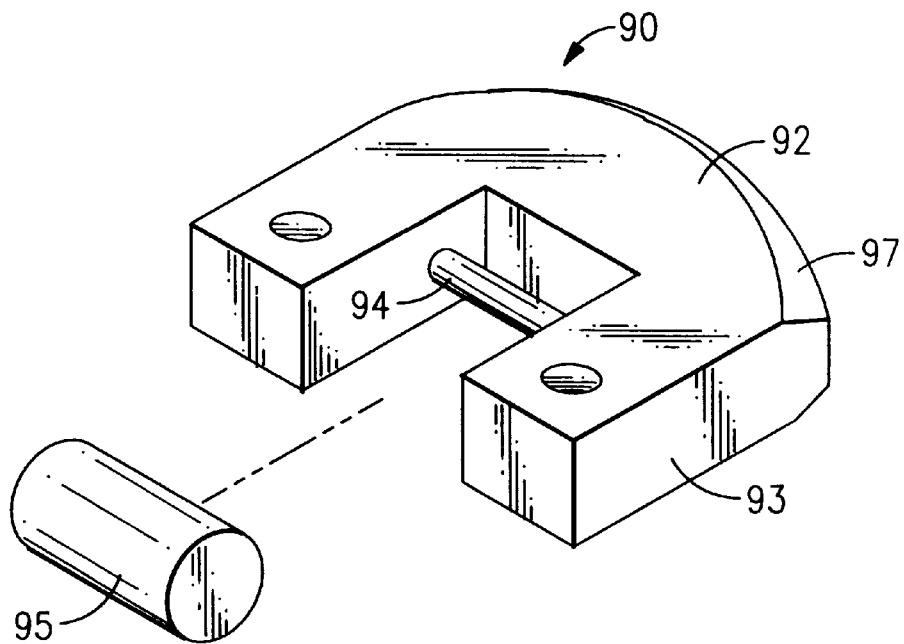
FIG. 9 is an enlarged perspective view of the bolt and latching mechanism employed in the second embodiment of the invention illustrated in FIGS. 6 and 7.

Turning now to FIGS. 6, 7 and 9 where there is shown a further embodiment of the invention wherein like references number are used to identify like components previously described in conjunction with the first embodiment of the invention. In this embodiment, the locking unit made up of the bolts and the latching pins is replaced with that shown in FIG. 9. Here again, the unit includes a pair of opposed bolts 90 that are slidably retained within the inner cylinder as explained above so that the bolts can move radially between a locked position as shown in FIG. 6 and an unlocked position as shown in FIG. 7.

The bolts in this case are U-shaped members having a curved end wall 92 integral with a pair of parallel lens 93—93. A pin 94 is mounted between the legs and a roller 95 is contained in the space between the arms in rolling contact with the pin. The rollers in assembly are also maintained in rolling contact with the underside of the stem 63. As best seen in FIG. 6 when the solenoid 60 is energized, the stem forces each roller downwardly into the space between the arms of the associated bolt, thus driving the bolts outwardly into locking engagement with the groove 72 in the outer cylinder. When the solenoid is de-energized, the set spring 57 drives the stem upwardly allowing the rollers to rotate upwardly over the pins as shown in FIG. 7, thus releasing the bolts. Each bolt again contains a top chamfer 97 about the periphery of the end wall which, under the influence of the release spring 29, ride along the inclined top wall of the groove 72 so that the bolt is automatically retracted into the inner cylinder during a quick release procedure.

While this invention has been explained with reference to the structure disclosed herein, it is not confined to the details set forth and this invention is intended to cover any modifications and changes as may come within the scope of the following claims:

What is claimed is:

1. Apparatus for rapidly changing the state of device from an active state to an inactive state that includes an outer member and an inner member slidably contained within the outer member, one of said members being connected to an activator means and the other of said members being connected to a control means for changing the state of a controlled device between an active state and an inactive state, locking means slidably contained within said inner member for movement between a retracted position wherein said locking means is fully retracted within said inner member and an extended position wherein the distal end of said locking means is contained within a recess formed in the outer member, latching means arranged to act upon the locking means, said latching means being positionable between a first latched position wherein said locking means is held in said extended position wherein said outer member is locked to said inner member and a second unlatched position wherein said locking means is free to move into the retracted position, solenoid means for holding the latching means in the latched position when said solenoid is energized and to releasing said latching means wherein said solenoid is de-energized whereby said locking means is freed to move into said retracted position, and a release spring acting between the two members for rapidly moving the two members in opposite directions wherein the latching means is moved from the latched to the unlatched position wherein the state of the controlled device is rapidly changed.

2. The apparatus of claim 1 wherein said members are elongated cylinders and said inner cylinder has a close sliding fit inside said outer cylinder.

3. The apparatus of claim 2 wherein said recess is a circumferential groove formed in the inner wall of the outer member.

4. The apparatus of claim 3 wherein said locking means further includes a pair of radially opposed flat rectangular shaped bolts, each of which contains a contoured +–distal end that complements the shape of said groove.

5. The apparatus of claim 4 wherein said groove has an inclined surface along which the bolts are directed into the retracted position when said latching means moves from a latched position to an unlatched position.

6. The apparatus of claim 5 wherein said latching means further include a lug mounted in a receiving opening formed in the top surface of each bolt, said lug containing rolling surfaces at each end, a stem means connected to the solenoid for placing the lugs in a radial position within the opening when the solenoid is energized whereby the bolts are held in said extended position.

7. The apparatus of claim 6 wherein said latching means further includes a set spring mounted within said inner member acting upon said stem means for biasing said stem means away from said lugs when the solenoid is de-energized to release said lugs whereby the lugs are permitted to move out of the opening as the bolts move into said retracted position.

8. The apparatus of claim 1 that further includes shock absorbing means for arresting the motion of the members during separation of said members by said release spring.

9. The apparatus of claim 4 wherein each bolt has a cutout passing inwardly from the proximal end thereof, said cutout containing a cylindrical shaft supported between side walls of said cutout.

10. The apparatus of claim 9 wherein said latching means further includes a roller contained in said cutout in rolling contact with said shaft, and a stem means connected to said solenoid for forcing the roller downwardly into said cutout when said solenoid is energized whereby the bolts are held in an extended position.

11. The apparatus of claim 10 wherein said latching means further includes a set spring mounted within the inner member that acts upon said stem means to bias said stem means away from said rollers when the solenoid is de-energized to permit the rollers to move out of said cutouts as the bolts move back to a retracted position.

12. Apparatus for rapidly closing a valve that includes an elongated cylindrical outer member and an elongated cylindrical inner member that is slidably contained within the outer member, connecting means for coupling the linear member to a linear actuator and the outer member to a valve stem, locking means slidably contained within said inner member for radial movement between a first retracted position wherein the locking means is fully contained within the inner member and a second extended position wherein the distal end of the locking means is positioned in a recess formed in the inner surface of the outer member, latching means arranged to act upon said locking means, said latching means being positionable between a latched position wherein the distal end of said locking means is held in an extended position wherein said outer member is locked to said inner member and a second unlatched position wherein said locking means is free to move, a stem means contained within said inner member in contact with said latching means, a solenoid mounted in said inner member having a rod connected to said stem means, said solenoid being arranged to move the latching means to a latched position when energized and an unlatched position when de-energized, and a release spring acting between the two members to rapidly move the members in opposite directions when the latching means is moved from the latched to the unlatched position wherein said valve is rapidly closed.

13. Apparatus according to claim 12, wherein, when said latching means is in said latched position, said latching means is held in place by a flat surface of said stem means.

* * * * *